United States Patent [19]

Draxelmayr

[11] Patent Number: 5,148,097

[45] Date of Patent: Sep. 15, 1992

[54] APPARATUS FOR STEPLESS CONTROL OF ELECTRIC LOADS BY THE PHASE ANGLE PRINCIPLE AND BRIGHTNESS CONTROLLER USING THE APPARATUS

[75] Inventor: Dieter Draxelmayr, Villach, Austria

[73] Assignee: Siemens Aktiengesellschaft, Munich, Fed. Rep. of Germany

[21] Appl. No.: 686,753

[22] Filed: Apr. 17, 1991

[30] Foreign Application Priority Data

Apr. 17, 1990 [DE] Fed. Rep. of Germany ....... 4012254

[51] Int. Cl.⁵ .................................................. G05F 5/02
[52] U.S. Cl. .................................... 323/237; 323/300; 323/320; 315/194; 315/291
[58] Field of Search ............... 323/235, 237, 241, 244, 323/300, 319, 320, 322, 323, 325; 307/262; 315/194, 291

[56] References Cited

U.S. PATENT DOCUMENTS

| 4,396,869 | 8/1983 | Rosenbaum et al. | 315/194 |
| 4,688,161 | 8/1987 | Covington | 323/235 X |

FOREIGN PATENT DOCUMENTS

| 2362225 | 6/1975 | Fed. Rep. of Germany . |
| 2429763 | 4/1978 | Fed. Rep. of Germany . |
| 2543370 | 4/1981 | Fed. Rep. of Germany . |
| 3836128 | 7/1989 | Fed. Rep. of Germany . |
| 3839373 | 10/1989 | Fed. Rep. of Germany . |

OTHER PUBLICATIONS

Publication 8136 Bauteile-Report Siemens (Siemens Component Report), vol. 15, No. 5 (1977.10); pp. 168–170, Kern & Strehle: "Elektronischer Helligkeitsregler mit Berührtaste" (Electronic Brightness Control w/Touch-Sensit.Key).

Publication Siemens AG, 1983, G. Möltgen "Stromrichtertechnik" (Current Converter Technology); pp. 64–69.

Primary Examiner—Emanuel T. Voeltz
Attorney, Agent, or Firm—Herbert L. Lerner; Laurence A. Greenberg

[57] ABSTRACT

An apparatus for stepless control of electric loads by the phase angle principle includes a semiconductor switch element. A trigger circuit is connected to the semiconductor switch element for furnishing turn-on pulses for triggering the semiconductor switch element. The trigger circuit includes at least one current flow detector, a turn-on pulse pregenerator circuit, a switch and driver unit, and a time-dependent circuit element. The on-state angle of each current half-wave is compared with a maximum allowable limit value of the on-state angle through the use of the current flow detector and the time-dependent circuit element, and a further triggering of the semiconductor switch element is prevented if the maximum allowable limit value of the on-state angle is exceeded. An apparatus for controlling the brightness of an incandescent bulb includes a transformer having a primary winding with two terminals and a secondary winding connected to an incandescent bulb. An alternating voltage source has one pole connected to one terminal of the primary winding. The semiconductor switch element has one main electrode connected to the other terminal of the primary winding and another main electrode connected to the other pole of the alternating voltage source.

2 Claims, 2 Drawing Sheets

APPARATUS FOR STEPLESS CONTROL OF ELECTRIC LOADS BY THE PHASE ANGLE PRINCIPLE AND BRIGHTNESS CONTROLLER USING THE APPARATUS

The invention relates to an apparatus for stepless control of electric loads or consumers by the phase angle principle, having a semiconductor switch element and a trigger circuit for furnishing turn-on pulses provided for triggering the semiconductor switch element, the trigger circuit including at least one current flow detector, a turn-on pulse pregenerator circuit, and a switch and driver unit. The invention also relates to a brightness controller using the apparatus.

An apparatus for stepless control of electric loads by the phase angle principle is known in principle and described, among other sources, in German Published, Non-prosecuted Application DE-OS 23 62 225, in German Published, Prosecuted Applications DE-AS 24 29 763 and DE 25 43 370 B2, and in an article by Kern and Strehle entitled "Elektronischer Helligkeitsregler mit Berührtaste" [Electronic Brightness Control with Touch-Sensitive Key], 8136 Bauteile-Report Siemens [Siemens Component Report], Vol. 15, No. 5 (1977.10), pp. 168–170. Such an apparatus typically has a semiconductor switch element, for instance a triac, in the main current path. The semiconductor switch element is triggered by turn-on pulses, so that the current in the main current path, or the output current of the control apparatus, is controllable as a function of the phase angle of the turn-on pulse. German Published, Non-Prosecuted Application DE 38 36 128 A1 discloses a brightness control circuit for incandescent bulbs in which a self-locking field effect transistor is provided instead of a triac.

If the electric load that is triggered by such an apparatus has a different operating voltage than the mains voltage from which the apparatus is supplied, then a transformer may be provided to convert the voltage. In such circuits, the control apparatus supplies the primary winding of the transformer as if the primary winding represented a typical load. The actual load operated with a different operating voltage is then disposed in the secondary circuit of the transformer. Such a load may, for instance, be a halogen bulb, which is operated at low voltage and is supplied from a utility grid, for instance at 220 V alternating voltage, through a transformer, and is controllable in stepless fashion by a control apparatus. If the bulb is functioning properly, a circuit configuration which includes a bulb in the secondary circuit of the transformer and in which the primary winding of the transformer is the load for the control apparatus, represents a virtually resistive load. The voltage and current are in phase and operation with a conventional control apparatus as described above is thus possible.

If the bulb fails in such a configuration, the following problems can arise:

depending on the turn-on time of the control apparatus, a very high magnetizing current can flow in the transformer. If that occurs repeatedly, for instance in a succession of a plurality of successive turn-on pulses at the power switch, then the transformer may be destroyed among other effects.

If the transformer core is magnetically saturated because of an unfavorable turn-on time in the remagnetization, then that causes current peaks because the load on the winding is only resistive, particularly if the secondary winding is in a no-load state. It can also destroy the transformer. The known apparatus for controlling an electrical load does not prevent such problems with adequate reliability, at least if the apparatus operates according to the two-wire technique.

Examples for applications of the use of the known control apparatus are conceivable in which a heat sensor is disposed on the transformer, for instance, which suppresses further turn-on pulses at the control apparatus, if an allowable transformer temperature is exceeded. It is also conceivable for the current flowing in the electrical load to be detected and shut off if it exceeds an allowable maximum current.

German Published, Non-Prosecuted Application DE 38 39 373 A1 describes a brightness control circuit according to German Published, Non-Prosecuted Application DE 38 36 128 A1, having a protection and limiting circuit, in which the output current of the brightness control circuit is measured and switched off if it exceeds a limit value. However, such protection circuits do not always reliably react in case of a problem if the on-state angle is unfavorable. A reliable circuit of that kind includes a fuse, which has to be replaced each time a bulb fails, so that such a circuit is very inconvenient.

It is accordingly an object of the invention to provide an apparatus for stepless control of electric loads by the phase angle principle and a brightness controller using the apparatus, which overcomes the hereinafore-mentioned disadvantages of the heretofore-known devices of this general type and which does so in such a way that the above-discussed problems are prevented with adequate reliability.

With the foregoing and other objects in view there is provided, in accordance with the invention, an apparatus for stepless control of electric loads by the phase angle principle, comprising a semiconductor switch element, a trigger circuit connected to said semiconductor switch element for furnishing turn-on pulses for triggering said semiconductor switch element, said trigger circuit including at least one current flow detector, a turn-on pulse pregenerator circuit connected to said at least one current flow detector, a switch and driver unit connected to said turn-on pulse pregenerator circuit, and a time-dependent circuit element connected to said at least one current flow detector, said current flow detector and said time-dependent circuit element providing means for comparing an on-state angle of each current half-wave with a maximum allowable limit value of an on-state angle, and means for preventing a further triggering of said semiconductor switch element if the maximum allowable limit value of the on-state angle is exceeded.

With the objects of the invention in view there is also provided an apparatus for controlling the brightness of an incandescent bulb, comprising a transformer having having a primary winding with two terminals and a secondary winding connected to an incandescent bulb, an alternating voltage source having two poles, one of said poles of said alternating voltage source being connected to one of said terminals of said primary winding, a semiconductor switch element having one main electrode connected to the other of said terminals of said primary winding and another main electrode connected to the other of said poles of said alternating voltage source, a trigger circuit connected to said semiconductor switch element for furnishing turn-on pulses for triggering said semiconductor switch element, said trigger circuit including at least one current flow detector, a turn-on pulse pregenerator circuit connected to said at least one current flow detector, a switch and driver unit connected to said turn-on pulse pregenerator circuit, and a time-dependent circuit element connected to said at least one current flow detector, said current flow detector and said time-dependent circuit element providing means for comparing an on-state angle of each current half-wave with a maximum allowable limit value of an on-state angle, and means for preventing a further triggering of said semiconductor switch element if the maximum allowable limit value of the on-state angle is exceeded.

In order to simplify explanation of the invention, some terms are defined below: in an apparatus for stepless control of electric loads by the phase angle principle, in which a triac, a thyristor configuration or a switch transistor configuration are accordingly operated in series with a load triggered by them at an alternating voltage source, a trigger angle fia is understood to be the turn-on time of the triac, thyristor or transistor, referred to the zero crossover of the alternating voltage. An on-state angle fib is understood to be the on-state duration of a half-wave (positive or negative), given in an angular measurement and referred to the course of the alternating voltage. This on-state period is initiated by the trigger angle fia and ended by the current zero crossover angle. The on-state period of the half-wave can be ascertained in units of time (seconds) from the on-state angle fib, if the frequency of the alternating voltage is known.

If an apparatus that operates by the phase angle principle supplies a purely resistive load, then the on-state period begins with the trigger angle fia and ends with the zero crossover of the alternating voltage. The maximum attainable on-state angle is thus defined, if fia=0°, by fib$_{max}$=180°. In that case the same current flows as if the load were operated directly at the alternating voltage source.

The Siemens textbook "Stromrichtertechnik" [Current Converter Technology] by G. Moeltgen, 1983, page 68, FIG. 2.42, shows the course of the current controlled by AC actuators with phase-angle control and with a purely inductive load, for various trigger angles fia. On page 64, FIG. 2.39, the same book shows the course of the current controlled through AC actuators with phase-angle control for a resistive-inductive load. From the aforementioned FIG. 2.42 it can be seen that with a purely inductive load, the following relationship exists between the on-state angle fib and the trigger angle fia:

fib=2(180°−fia).

If the load is purely inductive, the current rises from the trigger angle fia on, has a maximum at the zero voltage crossover, and then drops, analogously to the rising phase. The maximum attainable current course with a purely resistive load is attained in a purely inductive load at a trigger angle fia of 90°, aside from a phase shift by 90°. If the load has a resistive component and an inductive component, then with a purely resistive load this maximum attainable current source, aside from a phase shift, is attained at a trigger angle fia between 0° and 90°, depending on the ratio between the inductive and resistance components. In the example selected in the aforementioned FIG. 2.39, the corresponding trigger angle fia=45°.

The invention is based on the thought that the aforementioned problematic high current peaks in an apparatus for stepless control of electric loads by the phase-angle principle occur only if an inductive load is connected to the control apparatus. According to the invention, the on-state period or on-state angle fib is provided as a criterion for the recognition of an impermissibly high current.

It is essential to the invention that an apparatus for stepless control of electric loads by the phase angle principle is constructed in such a way that the on-state angle is provided as an indicator of the load (resistive or inductive), and that the load is no longer supplied with voltage, for instance by preventing further triggering of the semiconductor switch element, if a predetermined limit value of the on-state angle is exceeded.

The selection of this limit value depends primarily on the load being used. If the load is intended for use in an alternating voltage grid without a control apparatus by the phase angle principle, then an on-state angle of 180° is appropriate as a limit value. If there is a purely resistive load, a trigger angle fia between 0° and 180° is then possible, while with a purely inductive load a trigger angle fia between 90° and 180° is possible.

According to the principle of on-state angle detection, it may be problematic or trouble-inducing to detect an on-state angle in the immediate vicinity of 180°, because of the zero voltage crossovers at 0°, 180° and 360°. It may therefore be useful to select the limit value of the on-state angle to be different from 180°. It may also be useful to select the maximum allowable on-state angle to be greater than or less than 180°, if the load has a greater or lesser current-carrying capacity (even in case of a malfunction).

Other features which are considered as characteristic for the invention are set forth in the appended claims.

Although the invention is illustrated and described herein as embodied in an apparatus for stepless control of electric loads by the phase angle principle and a brightness controller using the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The various reference numerals represent the following circuit units:

| | |
|---|---|
| 1 | control apparatus (apparatus for controlling 2) |
| 2 | electric load |
| 3 | transformer |
| 4 | resistive load, bulb |
| 5 | semiconductor switch element, triac |
| 6 | trigger circuit |
| U | alternating voltage source |
| L | logic circuit |
| SD | current flow detector |
| T | time-dependent circuit element |
| D | switch and driver unit |
| PLL | turn-on pulse-pregenerator circuit, phase-locked loop counting circuit |
| CL | clock generator |
| CE | basic counter element |
| IV, IV1 | inverter |
| AND | AND gate |
| NOR1 | NOR gate |
| NOR2 | NOR gate |

| | |
|---|---|
| MF | monoflop |
| FF | D-flip-flop |
| a,c | connection terminal |
| b | turn-on pulse output terminal |
| h | output terminal |
| d,e,f,g | signal input terminal |

FIG. 1 is a basic schematic and block circuit diagram of an apparatus 1 for controlling an electric load by the phase-angle principle, which is connected in a two-wire configuration in series with an electric load 2, and a source U of alternating voltage supplying the apparatus, with the control apparatus 1 having a semiconductor switch element 5 and a trigger circuit 6 triggering it;

Figure 1:
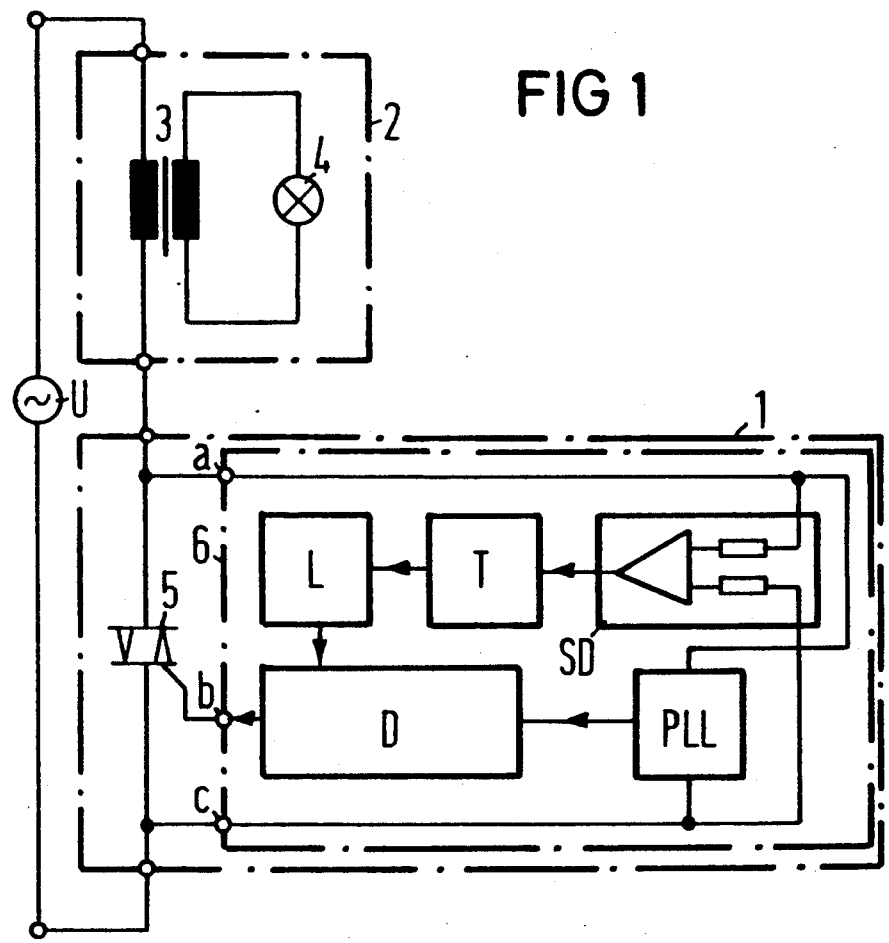

Referring now in detail to the figures of the drawing, in which circuit elements of identical function are provided with the same reference numerals, and first, particularly, to FIG. 1 thereof, there is seen an alternating voltage source U supplying an electric load or consumer 2 and having two poles. A transformer 3 is shown in this case as an exemplary embodiment of an electric load. A primary winding of the transformer 3 having two terminals is supplied from the alternating current source U and a resistive load, for instance a bulb 4, is connected to a secondary winding thereof. The primary winding of the transformer 3 is connected directly to a connection terminal of the alternating voltage source U and is connected through the control apparatus 1 to the other connection terminal of the alternating voltage source U. The semiconductor switch element 5 is connected into the current path between the alternating voltage source U and the electric load 2 in such a way that it can control the flow of current. A triac is shown as the semiconductor switch element 5 in FIG. 1. The triac is triggered by the trigger circuit 6 through a turn-on pulse output terminal b. The trigger circuit 6 is connected through a connection terminal a on one side of the semiconductor switch element 5 and through a connection terminal c on the other side of the semiconductor switch element 5. The trigger circuit includes a current flow detector SD. The current flow detector SD is a circuit element that furnishes a logic signal at its output whenever a current is flowing through the semiconductor switch element 5 and thus through the electric load 2. Current flow detectors are known. They may be constructed, among other ways, with the aid of a current sensor winding in the current circuit or a current sensor resistor in the current circuit, with a corresponding evaluation circuit. FIG. 1 shows a particularly simple circuit in the form of a basic circuit diagram. A comparator circuit with a quantity-forming input furnishes a certain logic level at its output whenever the quantity of the voltage present through the semiconductor switch element 5 drops below a certain minimum value.

The signal output of the current flow detector SD is connected to a time-dependent circuit element T. The time-dependent circuit element T emits a signal to the logic circuit L after a certain period of time has elapsed. This certain period of time defines a maximum allowable current flow angle fib, as a function of the alternating voltage frequency of the voltage source U. If the actual current flow period is shorter than the maximum allowable current flow period, then the time-dependent circuit element T is reset by the output signal of the current flow detector SD. The time in the time-dependent circuit element T only begins to run again after the current flow detector SD indicates the flow of a current in the electric load 2 or the semiconductor switch element 5. If the maximum allowable current flow period is exceeded, then the logic circuit L issues an interrupt signal to a switch and driver unit D and suppresses further triggering of the semiconductor switch element 5.

The switch and driver unit D receives turn-on pulse suggestions from a turn-on pulse pregenerator circuit PLL, as a function of typically externally settable conditions. The turn-on pulses have a correspondingly predetermined trigger angle fia. The turn-on pulse suggestions furnished by the turn-on pulse pregenerator circuit PLL are carried by the switch and driver unit D in amplified form to the control input or inputs of the semiconductor switch element as a function of the state of the output signal of the logic circuit L, among other factors. The turn-on pulse pregenerator circuit PLL may be constructed in a known manner. In modern control apparatus, the turn-on pulse pregenerator circuit typically includes a phase-locked loop, but this is not absolutely necessary.

Figure 2:
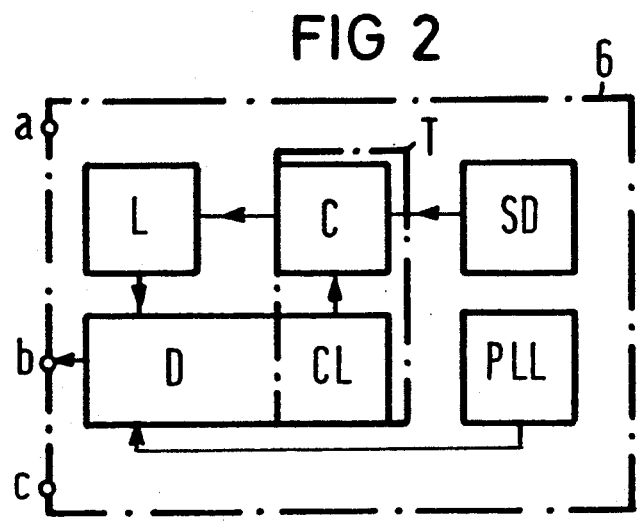
FIG. 2 is a basic block circuit diagram showing a possible embodiment of the trigger circuit 6 of FIG. 1, with a counter component C and a logic circuit L.

FIG. 2 shows one possible embodiment of the trigger circuit 6 of FIG. 1. A time-dependent circuit element T is formed in particular of a counter component or counting circuit C and a clock generator CL supplying it. As shown in FIG. 2, the clock generator CL may be a component of the switch and driver unit D. In FIG. 2, the output signal of a current flow detector SD is provided as the input signal for the counting circuit C, which counts according to the clock rate of the clock generator CL. If the current flow detector SD signals a flow of current, the counting circuit C begins to count. If the current flow detector SD signals the counter circuit C that the current flow has ended, the counter state is reset. Once the counting circuit C attains a predetermined counter status, which is equivalent to a maximum allowable current flow angle, as a function of the frequency of the clock generator and the frequency of the alternating voltage source U, before the end of the current flow has reset the counting circuit C, then the counting circuit passes a signal on to the logic circuit L. The logic circuit L then causes the switch and driver unit D to furnish no further turn-on pulses to a turn-on pulse output terminal b. An arbitrary counter from the prior art may be used as the counting circuit C. Binary counters can be used, but other counters can be used as well.

Naturally, the turn-on pulse output terminal b can include two connections, which trigger one semiconductor switch element for the positive half-wave, and one semiconductor switch element for the negative half-wave.

Figure 3:
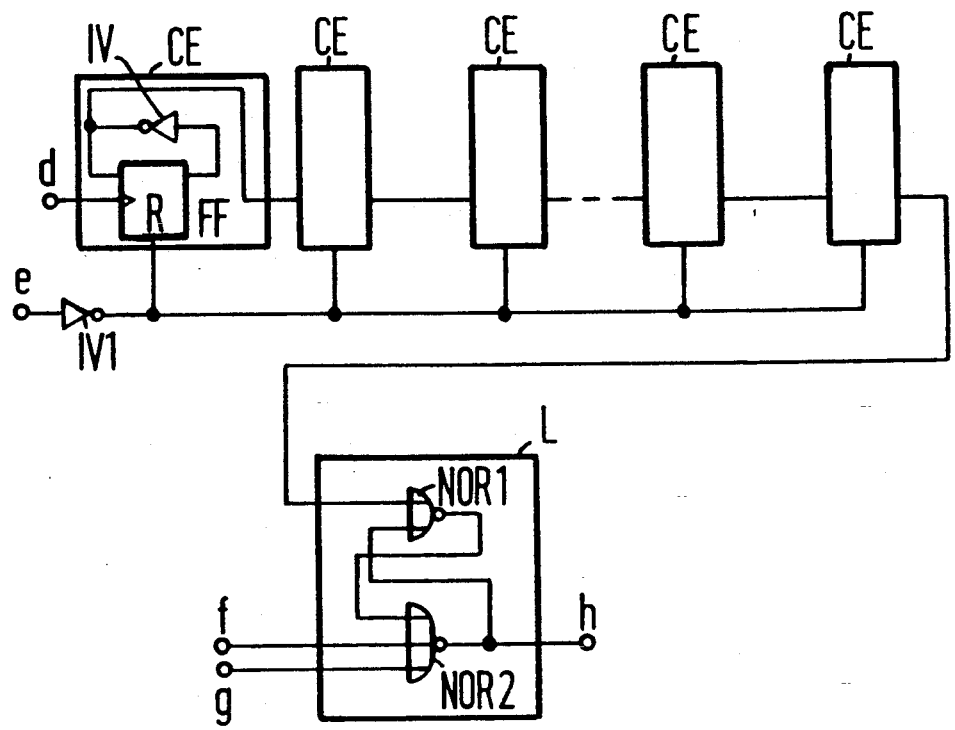
FIG. 3 is a basic schematic and block circuit diagram of a possible embodiment of the counter component C and logic circuit L of FIG. 2.

FIG. 3 shows a counting circuit as an exemplary embodiment, which is formed as a plurality of basic counter elements CE and a logic circuit L of the kind that can be used in FIG. 2. One basic counter element CE in this case can be in the form of a resettable D-flip-flop FF, having a reset input R which, optionally with the interposition of an inverter circuit IVI, is connected to a signal input terminal e that can be acted upon by the output signal of a current flow detector SD. An output of the D-flip-flop FF is connected through an inverter circuit IV to a D input of the flip-flop FF. The D input of the flip-flop FF also forms an output of a basic counter element CE. The clock signal input terminal d of the D-flip-flop FF forms the input of one basic counter element CE. The counting circuit of FIG. 3 is formed of a plurality of basic counter elements CE, which are connected in series in such a way that the output of one basic counter element CE is always connected to the input of the next basic counter element CE. The input d of the first basic counter element CE is acted upon by a clock signal through the clock signal input terminal d. The output of the last basic counter element CE of the series circuit forms the output of the counting circuit. The reset inputs R of all of the basic counting circuits CE are interconnected.

The exemplary embodiment of a logic circuit L shown in FIG. 3 contains a first NOR gate NOR1 and a second NOR gate NOR2. The first NOR gate NOR1 has two inputs, one of which is acted upon by the output signal of the counting circuit, and the other of which is connected to an output terminal h of the logic circuit L. The output of the first NOR gate NOR1 is connected to one of three inputs of the second NOR gate NOR2. The output of the second NOR gate NOR2 is connected to the output terminal h of the logic circuit L. In the exemplary embodiment of FIG. 3, the other two inputs of the second NOR gate NOR2 are respectively connected to a signal input terminal f and a signal input terminal g. A logical 1 at one of the signal input terminals f or g, independently of one another, leads to the resetting of the logic circuit L, if it is furnishing a logical 1 at the output terminal h. With a second NOR gate NOR2 having three inputs it is thus possible to reset the logic circuit L both automatically and manually through separate signal inputs. For instance, each time the control apparatus is turned on, a logical 1 can be applied to the signal input terminal f for resetting the logic circuit L, and through the signal input terminal g, a manual reset can be performed if needed. In principle, however, the second NOR gate NOR2 can also be constructed as a NOR gate having only two inputs.

The second NOR gate NOR2 furnishes a logical 1 at the output of the logic circuit L if a logical 0 is present at all of its inputs. If the signal input terminals f and g are acted upon by logical 0 levels, the logic circuit L furnishes a logical 1 at the output whenever the first NOR gate NOR1 outputs a logical zero level at its output. This is the case whenever the counter circuit C sends a logical 1 to the first NOR gate NOR1, and whenever the second NOR gate NOR2 furnishes a logical 1 at its output. This assures that the logic circuit furnishes a blocking signal at the output terminal h until such time as it has been reset.

Figure 4:
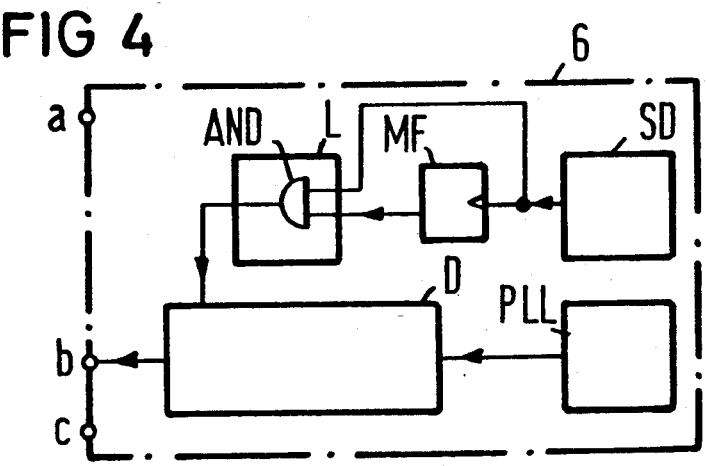
FIG. 4 is a schematic and block basic circuit diagram showing a further possible embodiment of the trigger circuit 6 of FIG. 1.

FIG. 4 shows a further possible embodiment of the trigger circuit 6 of FIG. 1 in the form of a basic circuit diagram. An edge triggered monoflop MF is provided as the time-dependent circuit element T. The output signal of a current flow detector SD is connected to both the input of the monoflop MF and to a first input of the logic circuit L.

In the embodiment of FIG. 4, an AND gate AND with two inputs is provided as one possible embodiment of a logic circuit L. The output of the monoflop MF is connected to a second input of the logic circuit L and thus to one of the inputs of the AND gate AND. The output of the logic circuit L is connected to the switch and driver unit D, which passes on turn-on pulses proposed by the turn-on pulse pregenerator circuit PLL to the turn-on pulse output terminal b in amplified form, as a function of the output signal of the logic circuit L. If the current flow detector SD in FIG. 4 signals a current flow, then the delay time of the monoflop MF begins to run with the rising edge of the output signal of the current flow detector SD. If the output of the current flow detector SD goes to a zero level because of the end of the flow of current, before the delay time in the monoflop has elapsed, so that the monoflop furnishes a 1 potential at its output, then the logic circuit L does not pass any further blocking signal on to the switch and driver unit D. However, if both the output of the current flow detector SD and the output of the monoflop MF each send a 1 to the AND gate AND, then the logic circuit L emits a blocking signal to the switch and driver unit D and thus prevents further passage of turn-on pulses to the turn-on pulse output terminal b. The time constant of the monoflop MF defines the maximum allowable on-state duration, as a function of the frequency of the alternating voltage source U.

An apparatus according to the invention is particularly suitable for stepless brightness control of incandescent bulbs that are connected in the secondary circuit of a transformer, if the primary winding of the transformer is triggered by the control apparatus according to the invention at an alternating voltage source.

I claim:

1. An apparatus for stepless control of electric loads by the phase angle principle, comprising a semiconductor switch element, a trigger circuit connected to said semiconductor switch element for furnishing turn-on pulses for triggering said semiconductor switch element, said trigger circuit including at least one current flow detector, a turn-on pulse pregenerator circuit connected to said at least one current flow detector, a switch and driver unit connected to said turn-on pulse pregenerator circuit, and a time-dependent circuit element connected to said at least one current flow detector, said current flow detector and said time-dependent circuit element providing means for comparing an on-state angle of each current half-wave with a maximum allowable limit value of an on-state angle, and means for preventing a further triggering of said semiconductor switch element if the maximum allowable limit value of the on-state angle is exceeded.

2. An apparatus for controlling the brightness of an incandescent bulb, comprising a transformer having having a primary winding with two terminals and a secondary winding connected to an incandescent bulb, an alternating voltage source having two poles, one of said poles of said alternating voltage source being connected to one of said terminals of said primary winding, a semiconductor switch element having one main electrode connected to the other of said terminals of said primary winding and another main electrode connected to the other of said poles of said alternating voltage source, a trigger circuit connected to said semiconductor switch element for furnishing turn-on pulses for triggering said semiconductor switch element, said trigger circuit including at least one current flow detector, a turn-on pulse pregenerator circuit connected to said at least one current flow detector, a switch and driver unit connected to said turn-on pulse pregenerator circuit, and a time-dependent circuit element connected to said at least one current flow detector, said current flow detector and said time-dependent circuit element providing means for comparing an on-state angle of each current half-wave with a maximum allowable limit value of an on-state angle, and means for preventing a further triggering of said semiconductor switch element if the maximum allowable limit value of the on-state angle is exceeded.

* * * * *